US005788213A

United States Patent [19]

Kanda et al.

[11] Patent Number: 5,788,213

[45] Date of Patent: Aug. 4, 1998

[54] ELECTRICALLY OPERATED PRESSURE CONTROL VALVE

[75] Inventors: Robert J. Kanda, Lake Orion; Michael A. LaMothe, Commerce, both of Mich.

[73] Assignee: Lectron Products, Inc., Rochester Hills, Mich.

[21] Appl. No.: 754,594

[22] Filed: Nov. 20, 1996

[51] Int. Cl.[6] .......... F16K 31/06

[52] U.S. Cl. .......... 251/129.15; 251/129.02

[58] Field of Search .......... 251/129.15, 129.02; 335/261, 262

[56] References Cited

U.S. PATENT DOCUMENTS 5,261,637 11/1993 Curnow .......... 251/129.15

*Primary Examiner*—Kevin Lee

*Attorney, Agent, or Firm*—Roger A. Johnston

[57] ABSTRACT

A low voltage solenoid operated pressure control valve having a valve body with an adjustable inlet orifice plug in one end with a valve seat formed around the orifice. The orifice communicates with a precision valving bore with a one-piece valve rod having a valving surface on the end for throttling flow over the valve seat. An annular magnetic armature is press fitted on the end of the valve rod extending externally off the valving bore. A nonmagnetic cover is disposed and sealed over the armature to enclose the valving bore. An encapsulated coil is disposed over the cover. A cylindrical pole casing is disposed over the coil and a flanged tubular pole member disposed over the cover and registered on the casing to provide a flux loop about the coil. A retaining ring frictionally engages the cover to retain the assembly. The valving bore is cross ported through the body to provide the flow outlet and the interior of the armature cover is ported to the outlet.

16 Claims, 3 Drawing Sheets

ELECTRICALLY OPERATED PRESSURE CONTROL VALVE

BACKGROUND OF THE INVENTION

The present invention relates to electrically operated valves and particularly electromagnetically actuated valves utilizing a solenoid coil for moving a valve obturator for controlling flow between an inlet and an outlet and particularly relates to valves of this type for controlling a bleed flow in the supply to an hydraulically operated device to permit electrical control of the supply pressure to the hydraulic load.

Specifically, the invention relates to electrically operated valves employed for providing a desired pressure at the outlet of a hydraulic pump by controlling bleed flow to the sump by means of an electrically controlled valve having its inlet tapped into the pump discharge through a flow control orifice. Electrically operated valves of this type are widely employed in automotive applications where the electromagnetic actuator or coil is energized from an on-board vehicle power supply typically in the range 10–14 Volts. In designing such a pressure control valve for on-board vehicle applications, and particularly for pressure control of the supply to an hydraulically operated accessory, for example an engine cooling fan for high-volume production of passenger car and light truck engines, it is desired that the valve be easy to assemble and install, low in manufacturing costs and reliable over the service life of the vehicle.

Where the electromagnetically actuated valve is operated onboard a vehicle from the low voltage vehicle power supply, and must provide pressure control of hydraulic fluid from a relatively high pressure source on the order of 1500 psi (10350 kPa) it is necessary to minimize the area of the valve member to reduce the forces which must be overcome by the electromagnetic actuator operating from the low voltage supply in order to provide the force required to move the valve member against the inlet supply pressure. Furthermore, where rapid response of the valve is required for certain automotive applications, such as for controlling an hydraulically operated cooling fan, it has been found desirable to utilize a pulse width modulated (pwm) direct current electrical control signal in order to provide the desired response. Where the low voltage solenoid actuator of such a valve is energized by a pwm control signal, it is necessary that the size and mass of the moveable valve member and armature be minimized in order to reduce the inertia and minimize the friction of the moving parts.

A known solenoid actuated valve for automotive cooling fan motor pressure control application is shown in FIG. 3, wherein the valve body 1 has threadedly engaged therewith a nose piece 2 having a filter 3 at the inlet and an inlet orifice 4 which defines a valve seat 5 communicating with a valving chamber 6. The valving chamber is closed by a tubular member 8 and a linear bearing bushing 9. The bushing 9 has received therein a pair of spaced ball bearing races denoted by reference numerals 10, 11 which have slidably received therein a nonmagnetic valve rod 12 which has a tapered poppet or pintle 13 mounted on the end thereof for throttling with respect to valve seat 5. The end of the valve rod 12 distal the valve seat extends exteriorly of the bushing 9 and has mounted thereon a magnetic armature 14 which is surrounded by a pole tube or magnetic flux collector 15 which is mounted on a tubular member 16 attached to the body 1. A bobbin 17 with a coil 18 wound thereon is received over the flux collector 15 and tube 16 and is covered by a cylindrical magnetic housing 23 for providing a flux loop about the coil. An elastomeric cap 19 is received over the end of the magnetic pole member. An adjustment screw 20 threaded through the end of the pole piece and lock nut 21 are used to adjust the bias of a spring 22 which urges the valve member in a direction toward the seat 5.

The prior art valve thus utilizes a separate poppet member attached to the valve actuating rod and requires a costly bearing assembly to guide the operating rod for the poppet during operation of the valve.

It has thus been desired to provide a solenoid operated pressure control valve which has a minimum volume, low operating force required, is low in manufacturing costs, easy to assemble and is reliable in extended vehicle service operation.

BRIEF SUMMARY OF THE INVENTION

It is an object of the present invention to provide a simply constructed electromagnetically actuated pressure control valve which has a minimum operating force requirement, is compact, low in manufacturing costs and reliable in extended service.

It is a further object of the present invention to provide a solenoid operated pressure control valve which has a minimum of parts and is easy to assemble and calibrate.

The valve of the present invention employs an electromagnetic actuator in the form of a solenoid coil which, upon energization, effects movement of an armature comprising an annular member attached to the end of a valve operating rod which includes a conical valving surface formed on the end thereof in a one-piece unitary valving member. The valving member is slidably received in the valve body and is operative on movement to throttle flow with respect to an annular valve seat provided in an orifice member adjustably received in the end of the valve body. An armature tube member is attached over the armature and end of the body. The coil bobbin and coil are received over the armature tube and an annular flanged flux collector is received over the end of the armature tube and retained thereon by suitable retaining means. The coil and bobbin are encapsulated with thermoplastic material which provides a receptacle for the connector terminal pin attached to the coil windings. The coil is operable for effecting armature movement related to the coil current for moving the valving surface with respect to the annular valve seat to control the bleed flow in the supply providing hydraulic fluid to a load such as an hydraulic motor. The present valve is particularly suitable for automotive applications for controlling hydraulic fluid flow to a hydraulic fan drive motor.

BRIEF DESCRIPTION OF TEE DRAWINGS

DETAILED DESCRIPTION OF THE INVENTION

Figure 1:
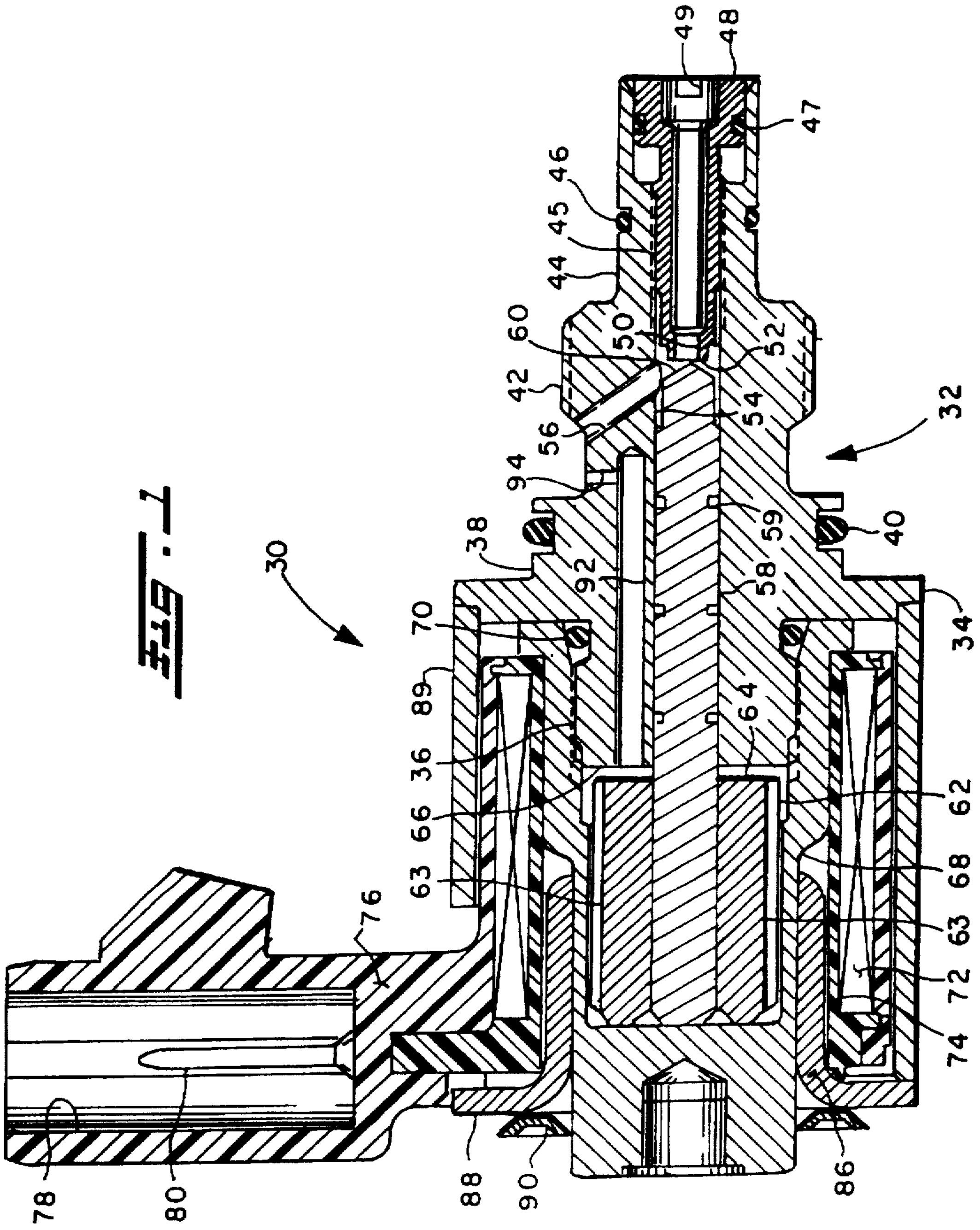
FIG. 1 is a cross-section of the assembled valve the present invention.
Figure 2:
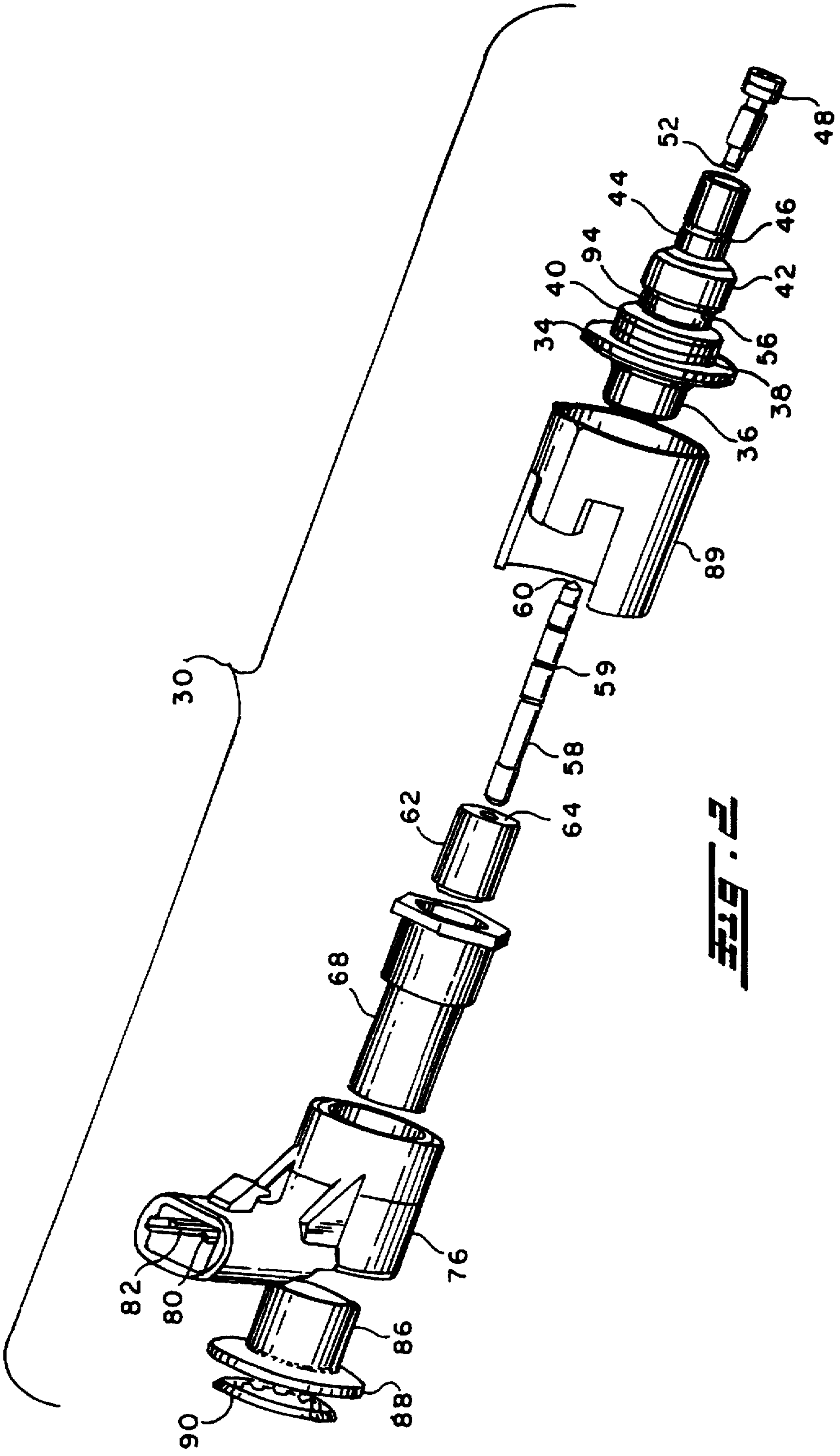
FIG. 2 is an exploded view of the valve of the present invention.
Figure 3:
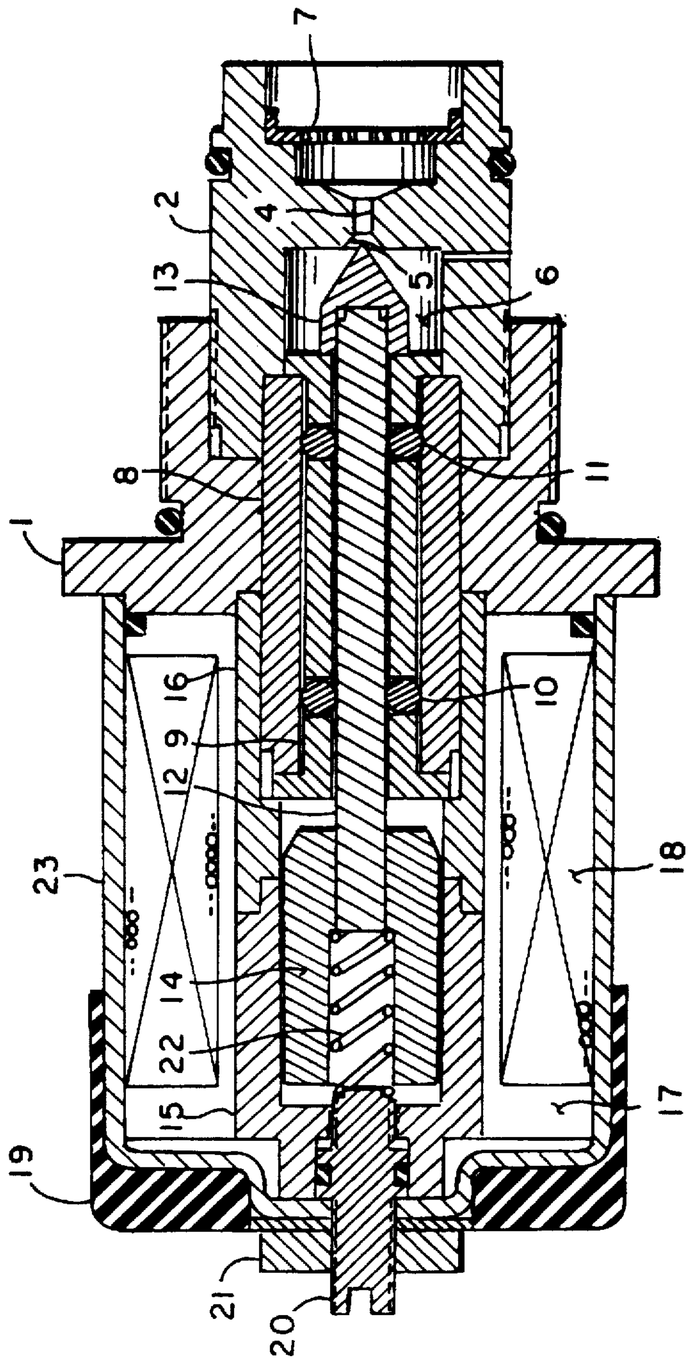
PRIOR ART FIG. 3
FIG. 3 is a cross-section of a prior art valve.

Referring to FIGS. 1 and 2, the valve assembly of the present invention is indicated generally at 30 and has a body indicated generally at 32 formed with an enlarged diameter flange 34 on one axial side of which is a threaded end portion 36 of lesser diameter. On the opposite side of flange 34 is a mounting diameter 38 of lesser diameter than flange 34, the diameter 38 being grooved with a resilient annular seal 40 received therein for mounting the body in a suitable bore or counterbore. The diameter 38 is adjacent a lesser diameter threaded fitting portion 42 which has on the distal side thereof a reduced diameter region 44 which is grooved with an annular resilient seal ring 46 provided therein for sealing in a bore provided in a fluid supply structure (not shown).

An inlet orifice defining member 48 is threadedly engaged in the end of body diameter 44; and, member 48 has a flow orifice 50 formed therein which communicates with an annular valve seat 52 formed in the end of the member 48. The valve seat communicates with a valving chamber bore 54 formed in the body, with bore 54 ported via passage 56 to the exterior of the body intermediate the seal rings 40 and 46 in order that the outlet passage 56 can communicate with the suction side of the pump. Member 48 is sealed in the body by an annular resilient internal seal ring 47 disposed in a circumferential groove formed in member 48.

It will be readily apparent from FIG. 1, that the orifice member 48 engages the body with threads denoted by reference numeral 45; and, rotation of the member 48 with a suitable tool as, for example, a screw driver engaging the slot 49 in the end of member 48, the axial position of the valve seat 52 may be adjusted.

It will be understood that the outlet port 56 communicates with a return port (not shown) of the pump for which hydraulic fluid flow control is to be maintained by the valve 30.

The valving bore 54 extends outwardly through the body 32 through the threaded end 36 and has disposed therein in precision closely sliding fit a valve member or rod 58 which extends axially outwardly of the body through the fitting 36.

The end of the valve member 58 disposed in the body has formed on the end thereof a tapered valving surface denoted by reference numeral 60 and which is configured to seat against the valve seat 52. Valving surface 60 is operative to throttle flow over the valve seat when the valving surface 60 is spaced from the valve seat by a small amount relative to the diameter of the valve seat.

The end of the rod 58 extending externally of the body 32 has attached thereto an annular armature member 62 which is formed of material of relatively high magnetic permeability. The armature has a plurality of circumferentially spaced slots formed therein which extend axially the length thereof and function to provide air passage around the armature and to enhance the stability by preventing any air pressure forces acting on the armature.

Armature 62 is preferably press-fitted onto the rod 58 and is positioned thereon such that with the valving surface 60 contacting valve seat 52 there is an air gap maintained between the axial face 64 of the armature which is preferably flat as shown in FIG. 1 and as shown in FIG. 1, the preferably flat end 66 of the body.

A tubular cover 68 is disposed over the armature and is threadedly engaged with the threads 36 on the body and sealed thereon by an annular seal ring 70, with the remote end of the cover closed to thus form a sealed chamber over the end of the armature. It will be understood that the cover 68 is formed of non-magnetizable material as, for example, aluminum, although other suitable materials may be employed.

An electrical coil 72 is wound on a bobbin 74 and encapsulated with insulating material as for example a thermoplastic material as indicated by reference numeral 76. The encapsulation of the coil 72 in the presently preferred practice of the invention has integrally formed therewith a connecting receptacle 78 which has disposed therein a pair of electrical connector terminals 80, 82 each of which is connected to one end of the coil winding in a manner known in the art.

The encapsulated coil is received over the cover 68 in closely fitting arrangement and is retained thereon by a magnetic flux collector 86 in the form of a tubular member extending partially within the coil and having a radially outwardly extending flange 88 formed on the end thereof exterior of the coil. The flux collector 86 and the coil assembly are retained on the cover 68 by a suitable retaining means such as a dished friction washer 90 which is pressed over the end of the cover 68.

The armature chamber is vented to the valve outlet by a bore 92 in the body which communicates with the armature chamber; and, bore 92 communicates with the outlet 56 via a cross-passage 94 drilled in the body to communicate with passage 92.

The coil assembly is surrounded by an annular or tubular housing 89 which registers against flange 34 on the body at one end thereof and has the flange 88 of the flux collector member 86 registered against the remote end thereof and thus serves as a spacer for the position of the tubular pole member 86 and completes the magnetic flux loop about the coil.

In operation, the valve is supplied hydraulic fluid at a controlled rate through an internal pump orifice, for example 0.2 GPM (0.75 liter/min.) at 25–30 psi (172–201 kPa) pressure drop across an orifice having a diameter of approximately 0.040 inches (1.016 mm). A predetermined desired calibration current is applied to the coil for example a current of 800 milliamperes and the orifice member 48 is adjusted until a desired output pressure is achieved as for example 950 psi (6555 kPa). The valve is then operated in a range from 0 milliamperes, at which the valve provides an output pressure of approximately 30 psi (207 kPa) to 800 milliamperes full scale.

The present invention thus provides a low cost, easy to manufacture and assemble, low voltage solenoid actuated pressure control or bleed valve which is constructed with a minimum number of parts.

Although the present invention has been described hereinabove with respect to the illustrated embodiments, it will be understood that the invention is capable of modification and variation and is limited only by the scope of the following claims.

We claim:

1. An electrically operated pressure control valve assembly comprising:
   (a) a body having a bore therethrough and including a member defining a valve seat and an inlet port communicating with said valve seat;
   (b) an outlet port formed in said body and communicating with said bore downstream of said valve seat;
   (c) an elongated one piece valve member formed of non-magnetizable material received in said bore for closely fitting sliding movement therein and having a valving surface thereon operable upon said sliding movement for throttling flow over said valve seat; said valve member extending outwardly of said bore distal said valve seat;
   (d) an annular armature formed of magnetically permeable material attached to said valve member exteriorly of said bore;
   (e) a cover disposed over said armature and sealed and secured on said body;

(f) an annular flux collector member disposed over said cover and surrounding a portion of said armature, including means retaining said flux collector on said cover;

(g) a coil disposed over said cover and a portion of said flux collector; and, (h) an annular housing attached to said body and surrounding said coil, wherein upon selected energization of said coil, said valve member is moved in said bore for throttling flow over said valve seat, and wherein upon said valving surface of said valve member contacting said valve seat on said body an air gap is maintained between an axial face of said armature and an end of said body.

2. The valve assembly defined in claim 1, wherein said annular armature is press fitted onto said valve member.

3. The valve assembly defined in claim 1, wherein said flux collector includes a radially outwardly extending flange operable for retaining said coil on said cover.

4. The valve assembly defined in claim 1, wherein said means retaining said flux collector comprises an annular member frictionally engaging said cover.

5. The valve assembly defined in claim 1, wherein said flux collector has a radially outwardly extending flange registered on said pole piece.

6. The valve assembly defined in claim 1, wherein said cover is threadedly connected to said body and includes a resilient seal ring.

7. The valve assembly defined in claim 1, wherein said coil is encapsulated with thermoplastic material.

8. The valve assembly defined in claim 1, wherein said valve seat member is adjustably mounted in said bore.

9. The valve assembly defined in claim 1, wherein said valve seat member is threadedly engaged in said bore.

10. The valve assembly defined in claim 1, wherein said cover is secured by threaded engagement with said body.

11. The valve assembly defined in claim 1, wherein said body is formed of magnetically permeable material and said cover is formed of nonmagnetic material.

12. The valve assembly defined in claim 1, wherein said means for retaining said flux collector comprises a spring washer.

13. The valve assembly defined in claim 1, wherein said valve member is formed of nonmagnetic stainless steel.

14. The valve assembly defined in claim 1, wherein said annular armature has a generally flat axial end face adjacent said body and defining said air gap therebetween.

15. The valve assembly defined in claim 1, wherein said body has a generally flat end face adjacent said armature and defining said air gap therebetween.

16. The valve assembly defined in claim 1, wherein said body has a generally flat end face and said annular armature has generally flat axial end face disposed adjacent said flat end face of said body defining said air gap therebetween.

* * * * *